May 11, 1937.  D. E. PATTERSON  2,079,661
FIBER SEPARATING MACHINE
Filed Feb. 19, 1932   10 Sheets-Sheet 3

Fig. 3.

Inventor
David E. Patterson

By Clarence A. O'Brien
Attorney

May 11, 1937. D. E. PATTERSON 2,079,661
FIBER SEPARATING MACHINE
Filed Feb. 19, 1932 10 Sheets—Sheet 5

Fig. 5.

Inventor
David E. Patterson

By Clarence A. O'Brien
Attorney

May 11, 1937.  D. E. PATTERSON  2,079,661
FIBER SEPARATING MACHINE
Filed Feb. 19, 1932   10 Sheets-Sheet 10

Inventor
David E. Patterson

By Clarence A. O'Brien
Attorney

Patented May 11, 1937

2,079,661

UNITED STATES PATENT OFFICE 2,079,661

FIBER SEPARATING MACHINE

David E. Patterson, Philadelphia, Pa.

Application February 19, 1932, Serial No. 594,070

6 Claims. (Cl. 19—30)

REISSUED
MAY 28 1940

This invention appertains to new and useful improvements in machines for obtaining fibers from plant stems, and the principal object of the invention is to provide a machine for separating the inner "woody" part of fibrous plant stems, which involves hemp, flax, sisal grass and the like, from the fibrous shell parts without injuring the fibers.

Practically all machines of this type now in general use have the fault of producing a fractured fiber, caused by either a too strenuous process or by a too severe compression between rolls, and sometimes fractured fiber is caused in some whipping processes. The ideal of a finished fiber should be of a "ribbony" effect and the present machine produces such a fiber. The purpose of the machine is to treat the material by a smooth regulated process instead of a "shock" process such as is now commonly employed.

During the course of the following specification, numerous other important objects and advantages of the invention will become apparent to the reader of the following specification.

In the drawings:—

Fig. 7 represents a sectional view substantially vertically through the structure shown in Fig. 6.

Figure 5:
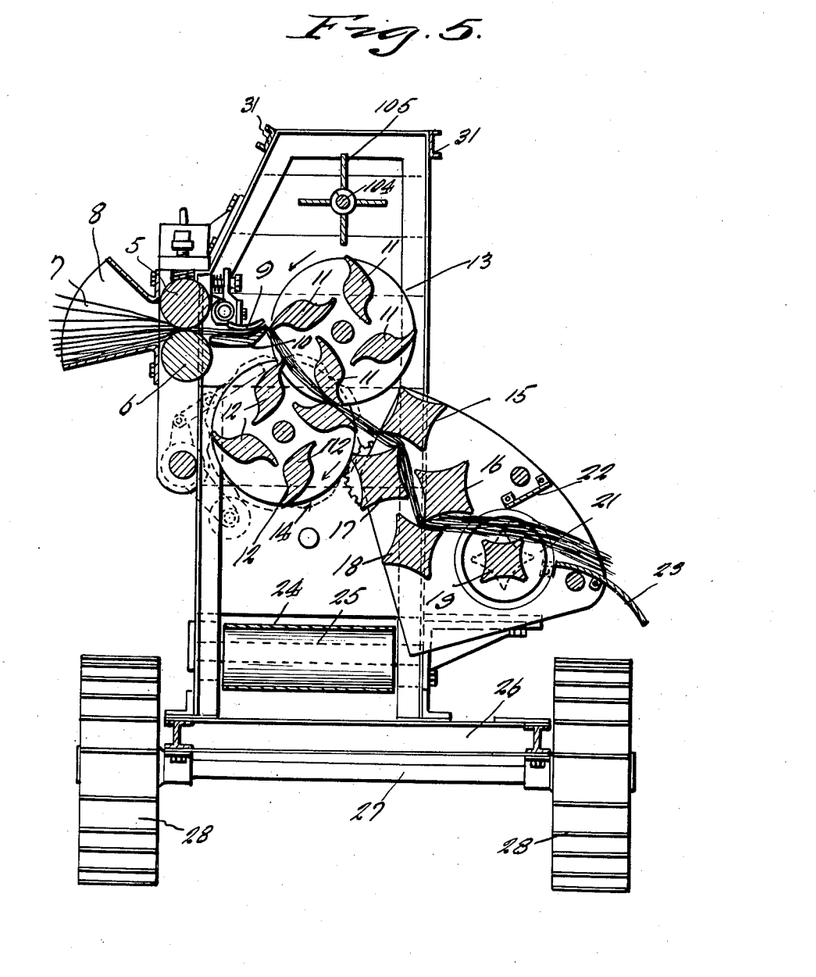
Fig. 5 represents a vertical sectional view through the machine taken substantially on line 5—5 of Fig. 1.
Figure 6:
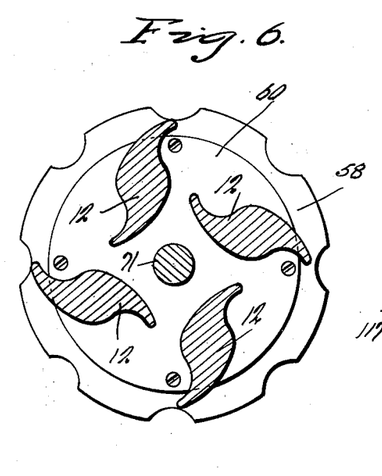
Fig. 6 represents a sectional view taken substantially on line 6—6 of Fig. 7.
Figure 8:
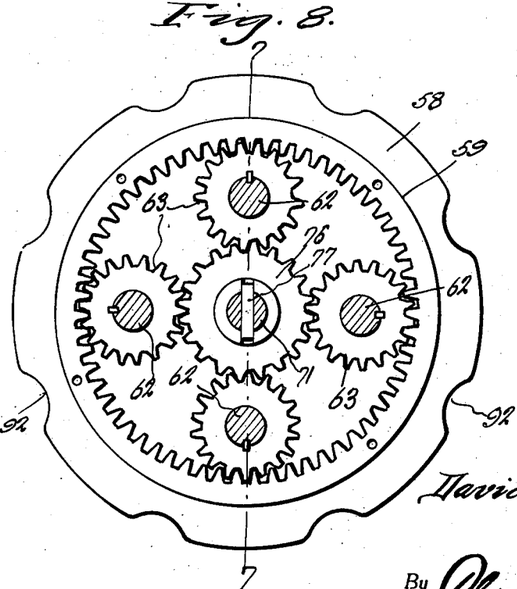
Fig. 8 represents a vertical sectional view through the mechanism shown in Fig. 7 adjacent the planetary gearing.
Figure 9:
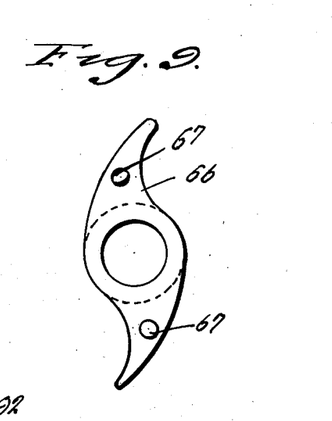
Fig. 9 represents an end elevational view of one of these keeper bars.
Figures 10, 15, 16, 17:
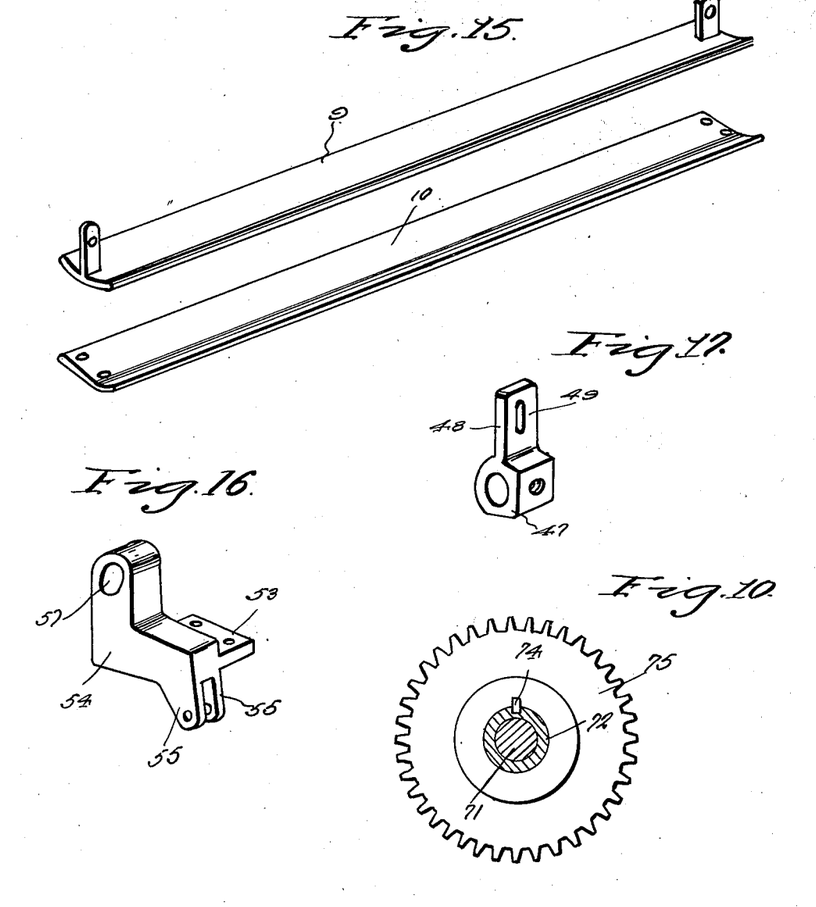
Fig. 10 represents a sectional view taken substantially on line 10—10 of Fig. 7.
Fig. 15 represents perspective views of the breaker and compression bars.
Fig. 16 represents a perspective view of one of the swingable breaker bar blocks.
Fig. 17 represents a perspective view of one of the compression bar lugs.
Figures 11, 12:
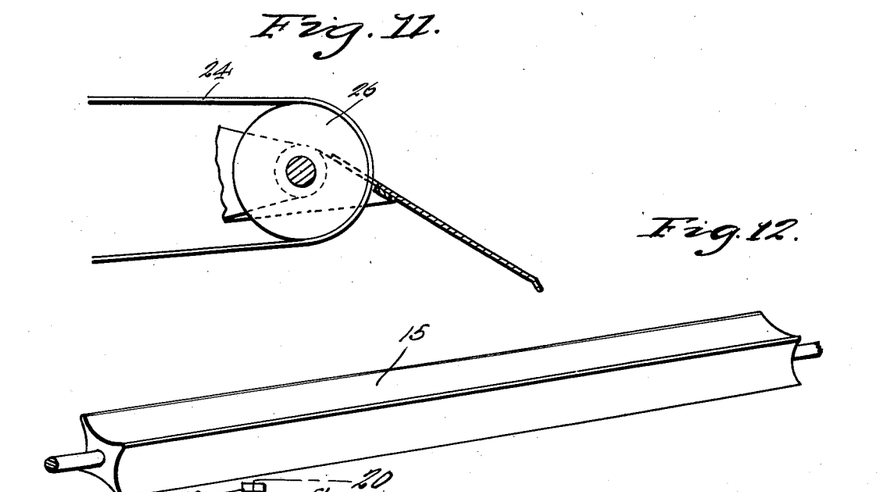
Fig. 11 represents a sectional view taken substantially on line 11—11 of Fig. 4.
Fig. 12 represents a perspective view of one of the scutchers.

Referring to the drawings wherein like numerals designate like parts, it can be seen that numerals 5—6 represent the upper and lower feed rolls of the machine. (See Fig. 5.) Material 7 can be fed into the hopper 8 to these rolls 5 and 6, and from these feed rolls, the material passes between the compression bar 9 and the breaker bar 10. Beater blades 11 and 12 are arranged in upper and lower assemblies 13 and 14 respectively, the upper blades 11 being individually rotatable with the assembly 13 moving in the direction of the arrow, while the lower blades 12 are also individually rotatable and adapted to wipe against the upper blades 11 as in the manner substantially shown in Fig. 5, while the blades 11 of the upper assembly 13 are complementary to the breaker parts 10, as shown in Fig. 5.

Situated in an inclined direction downwardly from the beaters 13 and 14 are the scutchers 15, 16, 17 and 18. These scutchers are of polygonal cross section and each has each of its sides concave to afford protruding corner portions which bite into the fibrous material in the manner substantially shown in Fig. 5.

Situated inclinedly below the scutchers aforementioned are the shaker sections 19 located on the shaft 20 along with the disk-like separators 21, which obviously serve to prevent bunching of the finished material, 22 representing an upper guide situated above the shakers and separators, while numeral 23 represents a discharge plate over which the material rides to pour into some suitable receptacle, (not shown).

Below the beater assemblies 13 and 14 is the conveyor web 24 trained over the rollers 25.

More specifically, it can be seen that the machine includes a rectangular-shaped chassis frame 26 to the bottom of which is secured the axle 27 on which the wheels 28 are journalled.

Upon each end portion of the chassis frame 26 is a vertically extending frame, one being located by numeral 29 while the other is denoted by numeral 30. Horizontal U-bars 31 serve to connect these frames 29 and 30 to maintain the same in the vertical position shown in Figs. 3 and 4. Detachably secured to each of these frames 29 and 30 are the bearing supporting plates $a$, $b$, $c$, $d$, and $e$. On one edge of the frames 29 and 30 is a bearing thru which the shaft 32 is journalled. Secured to each end of this shaft 32 is an upstanding standard 33, each of which is provided with a longitudinally extending opening 34 through which the reduced and flanged ends 5 of the upper and lower feed rolls 5 and 6 are slidable.

Numeral 36 represents the cap piece for the upper end of each of the standards 33 and thru each of these is threaded the set screw 37 which can be adjusted to control the tension of the spring 38 against the upper roll 5. Thus the tensional engagement of these rolls can be easily controlled.

Numeral 39 represents a dial on one of the end frames also forming a stationary bearing for shaft 32. Numeral 40 represents a triangular-shaped plate secured to one end of the shaft 32 having its apex end portion serving as a pointer 41, while its opposite end portion is provided with a segmental arrangement of teeth 42 for mesh with the worm gear 43 rotatably mounted upon the bracket 44. The frame defined by the standards 33 is suitably secured to the shaft 32 so that operation of the shaft will swing this frame. Any rotation of wheel 45 turns the worm wheel 43 and rotates the shaft 32, which turns freely in bearings 31 (see Figure 3), consequently, the frame 33, feed rolls 5, and 6, breaker arm 52, compression bar 9 and associated details will describe an arc of a circle with the shaft 32 as its center. By describing this arc an adjustment of the opening or "breaking clearance" is positively indicated by the calibrations on the plate 39, which is secured to the upright 29 in conjunction with the indicator hand 41.

This adjustment of the breaking clearance is absolutely essential to take care of the different sizes or thicknesses of stalks or straws of the raw fibers, particularly flax and hemp. Flax averages about one-sixteenth of an inch in diameter, and hemp grows to one-half inch in diameter, therefore, the breaking clearance suitable for flax would destroy all fibers larger than one-sixteenth of an inch. The machine as shown and described and controlled by wheel 45 and worm 43 gives a varying adjustment of breaking clearance from zero, so to speak, to three-fourths of an inch, or more if necessary. All previous fiber separating machines either have no means of adjustment for varying the thicknesses of straws or stalks of the raw fibers, or at best are provided with a crude hand adjustment where the machine must be stopped to make the adjustment, but this requires considerable time and labor.

Figures 13, 14, 20:
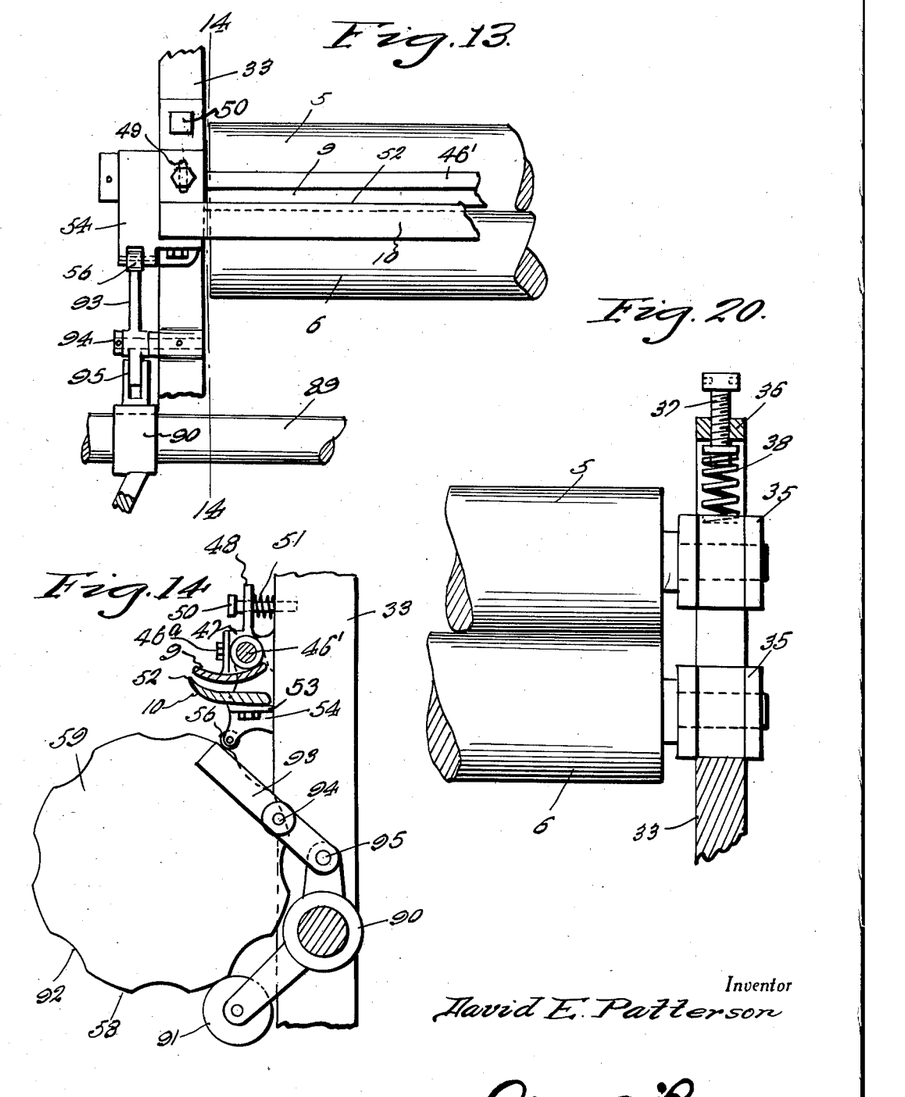
Fig. 13 represents a fragmentary detailed elevational view of the breaker and compressor and the operating means for the breaker bar.
Fig. 14 represents a sectional view taken substantially on line 14—14 of Fig. 13.
Fig. 20 represents a fragmentary sectional view taken substantially on line 20—20 of Fig. 18.
Figures 18, 19:
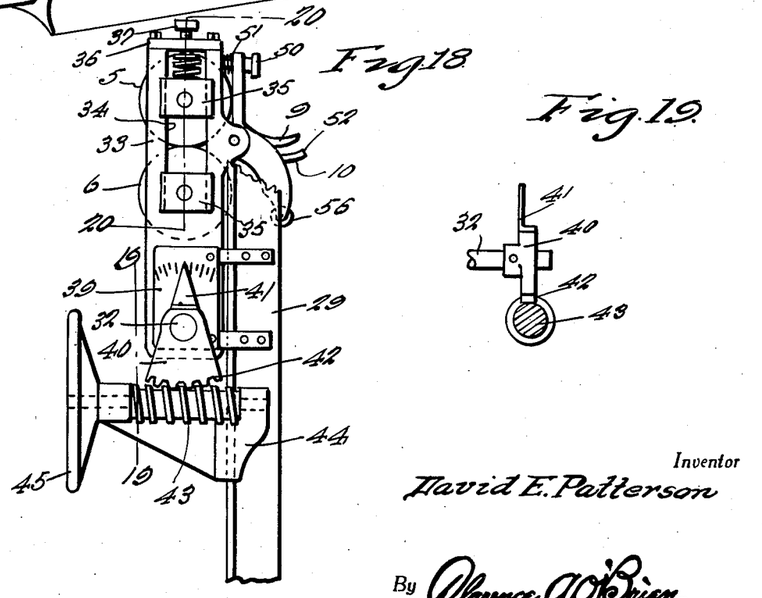
Fig. 18 represents a fragmentary side elevational view showing the means for operating the feed rollers to adjusted position.
Fig. 19 represents a sectional view taken on line 19—19 of Fig. 18.

As is clearly shown in Figs. 13 and 14, the standards 33 are provided with ears 46 through which the pintles extend for swingably supporting the blocks 54. Each of the ears 46 has an inwardly extending pin 46' for disposition in the corresponding collar 47, the upstanding members of the bar 9 being secured to the said collars as shown in Figure 14 by screws 46a. Each collar has extending therefrom a lug 48 having a slot 49 therein for receiving the pin 50 which is disposed through the same and driven into the adjacent standard 33, with a spring 51 interposed between the same and the said standard to maintain the compression bar 9 in a tensioned position toward the underlying breaker bar 10. Both of these bars are curved transversely in the same direction, the breaker bar provided with a raised inner edge portion 52, over which the material is bent to secure the breakage of the woody center portions of the plants so that it may slip from the fibrous part before reaching the subsequent operation of the machine.

The breaker bar is rockable with the blocks 54, each block 54 being mounted at its ends on the corresponding pins 46'. The rod 46' extends through the openings 57 in the blocks 54 as is shown in Figures 13 and 14.

Excepting for the cam annulus 58 on one of the gear boxes of the lower beater assembly 14, the construction of the beater assembly 13 is identical. Therefore a description in detail of the lower assembly 14 will suffice for both beater assemblies.

Referring to Fig. 7, it can be seen that the beater assembly 14 is equipped with a gear box 59 at one end having the cam annulus 58 thereon, and with a plane gear box at its opposite end (not shown). The gear box 59 is provided with a cover plate 60 which is provided with a hub 61 and radially disposed openings in the plate 60 through which the stub shafts 62 extend, the ends of the stub shafts in the box 59 being provided with pinions 63, while the outer ends pass through the barrels 64 and into the corresponding beater blades 12, the stub shafts 62 being secured to the barrels 64 by pins 65 while the barrels 64 are provided with end plates 66 for the blades 12, which have detents 67 engaged into recesses in the corresponding ends of the blades.

Figure 3:
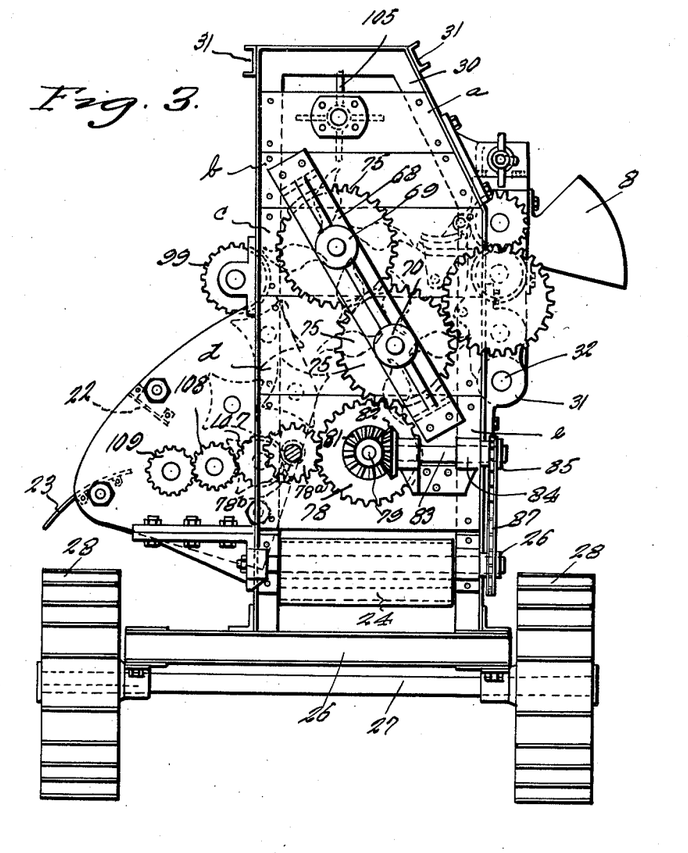
Fig. 3 represents an end elevational view of the machine.
Figure 4:
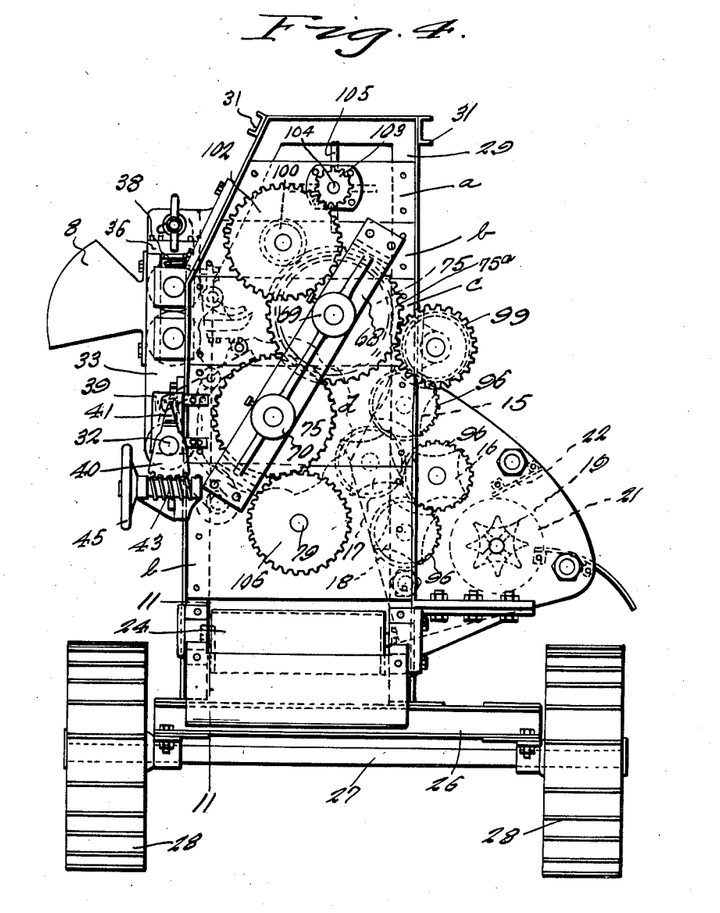
Fig. 4 represents an end elevational view of the machine looking at the opposite end from that shown in Fig. 3.

As is clearly shown in Figs. 3 and 4 a bridge member 68 has its ends secured to the bearing plate $b$ and $e$, and is equipped with a pair of bearings 69—70. As is clearly shown in Figure 7, a mounting 68 having an integral collar 70 receiving one end of the shaft 71 furnishes the stationary support for the planetary gearing of the elements 12. The stub shaft 71 is keyed as at 73 to the collar 70 and in turn, the gear 76 is keyed to the shaft 71, so that the gear does not rotate. The sleeve 72 on the shaft 71 is free to rotate thereon and carries the gear 75, the gear 75 being keyed to the sleeve 72 as at 74. The gear housing 59 is keyed to sleeve 72 as at 77 and is internally geared and with this mesh the planetary gears 63 located on the stub shafts 62 projecting from the members 12. These planetary gears 63 mesh with the gear 76. In this manner, the gear 75 is rotated, the sleeve 72 also rotates, and in turn rotates the gear housing 59 which imparts rotary motion to the planetary gears 63, besides causing the housing 59 to rotate around the gear 76, thus causing the assembly of the members 12 to rotate besides the members individually. The lower gear 75 meshes with the gear 78 on the power shaft 79. The power shaft 79 at one end is provided with the power pulleys 80 and at this end of the shaft, a beveled gear 81 is provided in mesh with the beveled gear 82 on a shaft 83 journalled in the bearings 84. This shaft 83 is also equipped with a sprocket wheel 85 overlying a sprocket wheel 86 on the shaft with the conveyor roll 26. Trained over these sprocket wheels 85 and 86 is the sprocket chain 87 whereby power can be transmitted to the conveyor belt 24.

Numeral 88 represents a tensioning device for the under flight of the belt conveyor 24. It can be seen, that numeral 89 represents a shaft having a bell crank 90, having one end carrying the roller 91 which rides against the cam annulus 58, the latter being provided with recesses 92 which impart an oscillatory motion to the bell crank 90.

Numeral 93 represents a rockable arm fulcrumed as at 94 and pivotally connected as at 95 to the remaining end of the bell crank 90, the free end of the rockable arm 93 having the roller 56 riding against the same, and by way of this rocker arm, the oscillatory motion of the bell crank 90 imparted by the wheel 58 is transmitted by way of the rocker arm 93 and roller 56 to the breaker bar 10. Thus motion is imparted to the breaker bar and the cam annulus 58 is rotated by the lower beater assembly 14.

Figure 1:
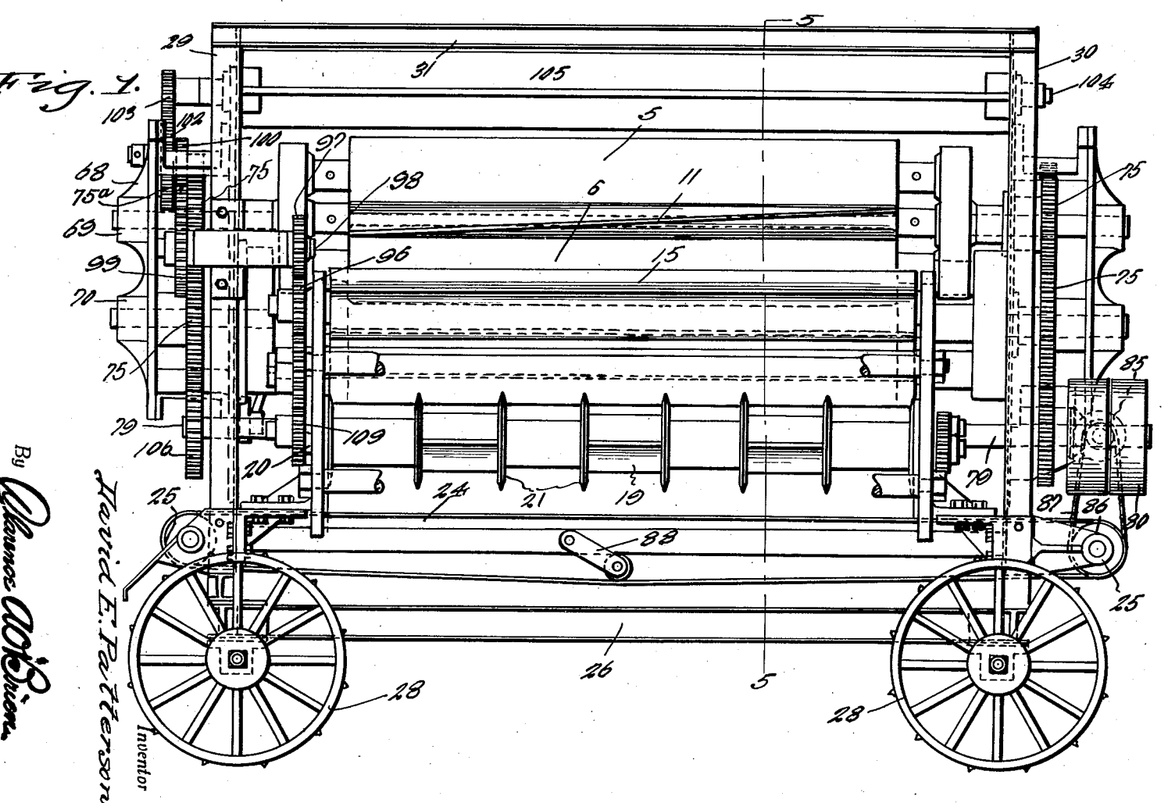
Figure 1 is a side elevational view of the novel machine, showing the discharging thereof.
Figure 2:
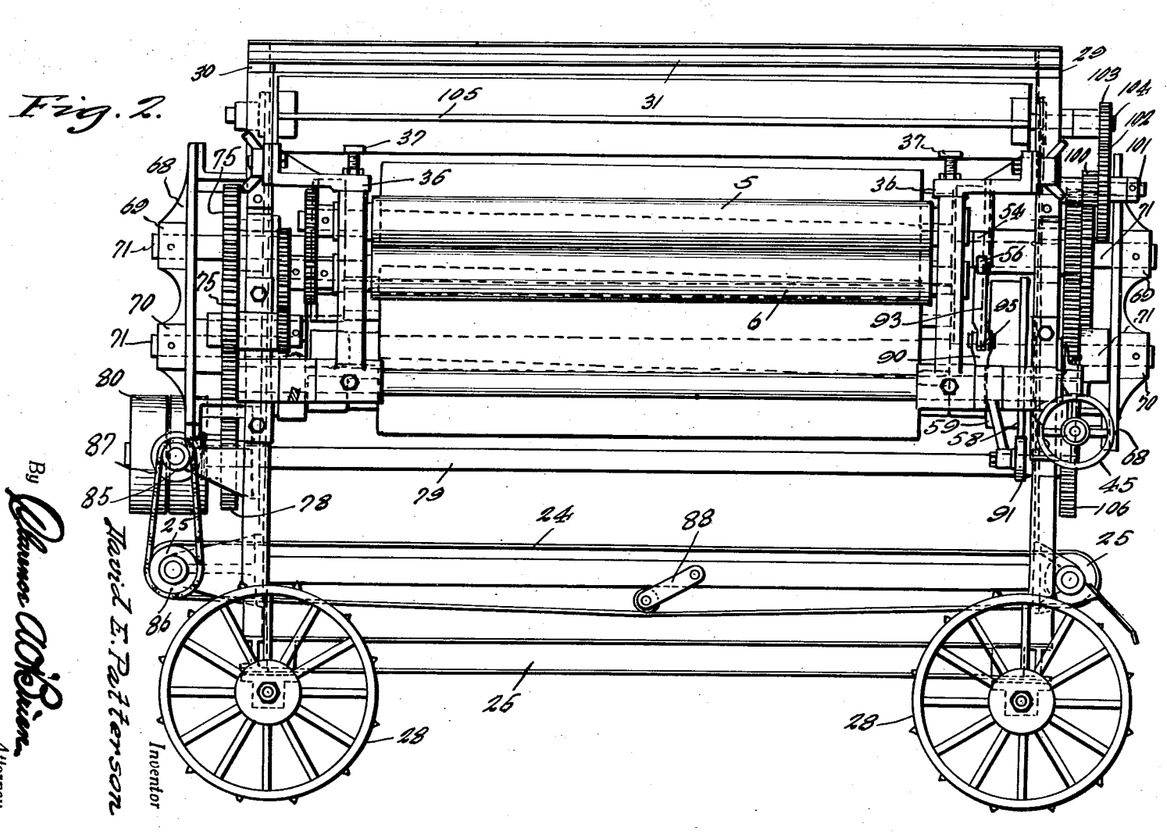
Fig. 2 represents a side elevational view of the machine looking at the side opposite to that shown in Fig. 1, and showing the feed roller arrangement.

As is clearly shown in Fig. 1, one end of each of the scutcher members 15 is equipped with a gear 96, and as is clearly shown in Fig. 4, these gears 96 mesh one with the other and the uppermost gear 96 meshes with the gear 97 on the shaft 98, which is also provided with a gear 99 meshing with the gear 95a which in turn meshes with the pinion 100 on the stub shaft 101. As shown in Figure 4 the lower gear 75 meshes with the upper gear 75 on the shaft with the larger gear 75a, the latter gear in turn meshing with the pinion 100 on the shaft with the gear 102, the latter in turn meshing with the pinion 103. (Also see Figure 1.) On this shaft 101 is the gear 102 which meshes with the pinion 103 on the shaft 104 which has its ends journalled through the upper bearing plate a. This shaft 104 is equipped with an elongated impeller 105 for causing a downward draft of air through the machine and to promote this draft, the machine, as shown in Figure 1, will be supplemented by a shell or casing which will have an air inlet opening therein. (Not shown.) The lowermost scutcher 18 has a gear 107 mounted on the shaft thereof and this meshes with a pinion 78b on an adjacent stub shaft, and this stub shaft has a gear 78a meshing with the gear 78 on the shaft 79. Thus the lowermost scutcher 18 is driven.

Figures 21, 22:
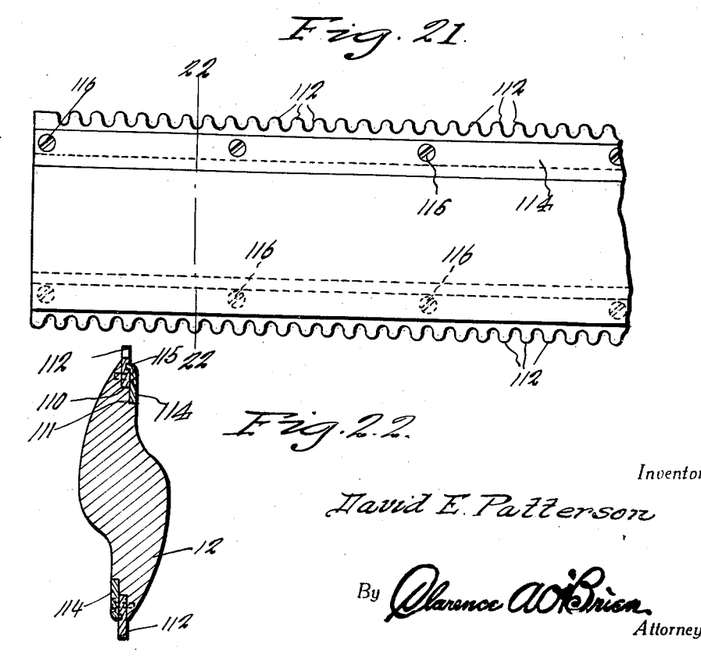
Fig. 21 represents a fragmentary side elevational view of a modified form of beater blade.
Fig. 22 represents a cross sectional view taken substantially on line 22—22 of Fig. 21.
Figure 23:
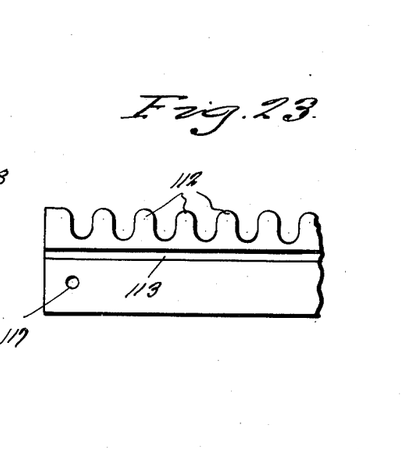
Fig. 23 represents a fragmentary side elevational view of the toothed bar of the modified form of beater blade shown in Fig. 21.

As is apparent in Figs. 21, 22 and 23, the beater blades 11 or 12 can have their edge portions cut away to provide the shoulders 110 and 111 adjacent each edge thereof, the outer shoulder 110 forming an abutment for the toothed bar 112 which has a longitudinally extending groove 113 therein, while the other shoulder 111 forms an abutment for the retaining bar 114 which has a laterally disposed edge portion 115 for disposition into the aforementioned groove 113 of the toothed bar 112, and suitable screws 116 can be disposed through openings in the retaining bar 114 and through openings 117 in the toothed bar 112 to engage into the body of the blades 11 or 12 to retain the toothed bar 112 detachably to the blade at each edge portion thereof.

As is clearly shown in Fig. 1, the beater blades 12 have a slight longitudinal twist so that not all of the adjacent blades are simultaneously opened along their entire lengths, this contact being progressive, and this is also true of the engagement of the upper blade 11 against the beater bar 10.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A machine for separating the material in plant stems comprising feed rollers, and vibratory means for bending the stems at intervals to break open the outside part thereof, supplemental means for removing the pithy interior parts of the stems from the outside fibrous parts, said last-mentioned means comprising a pair of rotary assemblies, each provided with a plurality of longitudinally spiral and individually rotatable blades.

2. A machine for separating the material in plant stems comprising feed rollers, and vibratory means for bending the stems at intervals to break open the outside part thereof, supplemental means for removing the pithy interior parts of the stems from the outside fibrous parts, said last-mentioned means comprising a pair of rotary assemblies, each provided with a plurality of longitudinally spiral and individually rotatable blades, the blades of one group being successively engageable with the bending means for effecting the bending of the material, the blades of the other group being successively engageable with the blades of the preceding group.

3. A machine of the character described comprising a pair of pressing rolls, a beater plate, a compression plate complementary to the beater plate, rotary blades complementary to the beater plate for bending material passing over the first-mentioned plate, and a fan for forcing a draft downwardly through the rotary blade.

4. A machine of the character described comprising a pair of pressing rolls, a beater plate, a compression plate complementary to the beater plate, rotary blades complementary to the beater plate for bending material passing over the first-mentioned plate, a fan for forcing a draft downwardly through the rotary blade, and an endless conveyor below the rotary blade for catching material dropping from the beating operation.

5. In combination, a feed roll mount, a rotary beater assembly comprising a plurality of blades, a breaker plate vibratorily mounted on the beater feed roller mount, a cam on the rotary beater, a connection between the breaker and the cam for vibrating the said plate and means whereby the said feed roller mount can be adjusted.

6. In combination, a feed roll mount, a rotary beater assembly comprising a plurality of blades, a breaker plate vibratorily mounted on the beater feed roll mount, a cam on the rotary beater, a connection between the breaker and the cam for vibrating the said plate and means whereby the said feed roller mount can be adjusted, said adjusting means comprising a shaft carrying the roller mount, a segmental gear on the shaft, worms meshing with the gear, and a hand wheel for operating the worm.

DAVID E. PATTERSON.